(12) United States Patent
Shiao et al.

(10) Patent No.: US 9,178,465 B2
(45) Date of Patent: *Nov. 3, 2015

(54) PHOTOVOLTAIC ROOFING ELEMENTS INCLUDING TIE LAYER SYSTEMS AND ROOFS USING THEM

(71) Applicant: CertainTeed Corporation, Valley Forge, PA (US)

(72) Inventors: Ming-Liang Shiao, Collegeville, PA (US); Husnu M. Kalkanoglu, Swarthmore, PA (US); Wayne E. Shaw, Glen Mills, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,754

(22) Filed: May 14, 2013

(65) Prior Publication Data

US 2014/0338272 A1    Nov. 20, 2014

Related U.S. Application Data

(63) Continuation of application No. 12/266,409, filed on Nov. 6, 2008, now Pat. No. 8,438,796.

(60) Provisional application No. 60/985,932, filed on Nov. 6, 2007, provisional application No. 60/985,935, filed on Nov. 6, 2007, provisional application No. 60/986,556, filed on Nov. 8, 2007.

(51) Int. Cl.
*H01L 31/048* (2014.01)
*H02S 20/25* (2014.01)
*H02S 20/23* (2014.01)

(52) U.S. Cl.
CPC ............... *H02S 20/25* (2014.12); *H02S 20/23* (2014.12); *Y02B 10/12* (2013.01); *Y02E 10/50* (2013.01)

(58) Field of Classification Search
CPC ............... H01L 31/0482; H01L 31/18; H01L 31/02008; H01L 31/052; Y02B 10/12; Y02B 10/20; Y02E 10/50
USPC ................................ 52/173.3; 136/244, 251
See application file for complete search history.

(56) References Cited

U.S. PATENT DOCUMENTS 4,189,882 A * 2/1980 Harrison et al. ................. 52/222
4,396,665 A * 8/1983 Rowe ............................. 428/148

(Continued)

FOREIGN PATENT DOCUMENTS

EP    0 747 971 A2    11/1996
EP    1 201 842 A1    2/2002

(Continued)

OTHER PUBLICATIONS

International Search Report and Written Opinion for PCT/US2008/082664, dated Jan. 25, 2010.

*Primary Examiner* — Brent W Herring
(74) *Attorney, Agent, or Firm* — McDonnell Boehnen Hulbert & Berghoff LLP

(57) ABSTRACT

The present invention relates generally to photovoltaic devices. The present invention relates more particularly to photovoltaic roofing products in which a photovoltaic element is joined to a roofing substrate. In one embodiment, the present invention provides a photovoltaic roofing element comprising: an encapsulated photovoltaic element having a top surface and a bottom surface, a top layer material at its top surface and a bottom layer material at its bottom surface; a roofing substrate having a top surface; and a tie layer system disposed between the encapsulated photovoltaic element and the roofing substrate and joining the bottom surface of the encapsulated photovoltaic element to the top surface of the roofing substrate.

11 Claims, 4 Drawing Sheets

(56) References Cited

U.S. PATENT DOCUMENTS

| | | | |
|---|---|---|---|
| 4,860,509 A | 8/1989 | Laaly et al. | |
| 4,936,063 A | 6/1990 | Humphrey | |
| 5,022,381 A | 6/1991 | Allegro | |
| 5,112,408 A | 5/1992 | Melchior | |
| 5,421,909 A | 6/1995 | Ishikawa et al. | |
| 5,437,735 A | 8/1995 | Younan et al. | |
| 5,470,396 A | 11/1995 | Mongon et al. | |
| 5,575,861 A | 11/1996 | Younan et al. | |
| 5,768,831 A | 6/1998 | Melchior | |
| 5,968,287 A | 10/1999 | Nath et al. | |
| 6,120,901 A | 9/2000 | Ojeda | |
| 6,155,006 A | 12/2000 | Mimura et al. | |
| 6,197,395 B1 * | 3/2001 | Van Vechten et al. | 428/36.92 |
| 6,245,987 B1 | 6/2001 | Shiomi et al. | |
| 6,310,281 B1 * | 10/2001 | Wendt et al. | 136/256 |
| 6,311,436 B1 | 11/2001 | Mimura et al. | |
| 6,360,497 B1 | 3/2002 | Nakazima et al. | |
| 6,365,824 B1 | 4/2002 | Nakazima et al. | |
| 6,414,237 B1 * | 7/2002 | Boer | 136/251 |
| 6,521,821 B2 | 2/2003 | Makita et al. | |
| 6,553,729 B1 | 4/2003 | Nath et al. | |
| 6,564,523 B1 * | 5/2003 | Iole et al. | 52/521 |
| 6,729,081 B2 | 5/2004 | Nath et al. | |
| 6,869,981 B2 | 3/2005 | Fewkes et al. | |
| 6,930,238 B2 * | 8/2005 | Makita et al. | 136/251 |
| 7,342,171 B2 | 3/2008 | Khouri et al. | |
| 7,407,718 B2 * | 8/2008 | Hazel et al. | 428/701 |
| 8,375,653 B2 * | 2/2013 | Shiao et al. | 52/173.3 |
| 8,381,466 B2 * | 2/2013 | Ehbing et al. | 52/173.3 |
| 8,438,796 B2 * | 5/2013 | Shiao et al. | 52/173.3 |
| 8,458,967 B2 * | 6/2013 | Kalkanoglu et al. | 52/173.3 |
| 8,522,491 B2 * | 9/2013 | Kneip et al. | 52/173.3 |
| 8,567,154 B2 * | 10/2013 | Babineau et al. | 52/747.1 |
| 8,607,513 B2 * | 12/2013 | Anderson | 52/173.3 |
| 8,656,658 B2 * | 2/2014 | Shufflebotham et al. | 52/173.3 |
| 2001/0054262 A1 | 12/2001 | Nath et al. | |
| 2004/0144043 A1 | 7/2004 | Stevenson et al. | |
| 2004/0244829 A1 * | 12/2004 | Rearick et al. | 136/251 |
| 2005/0103375 A1 | 5/2005 | Nagao et al. | |
| 2005/0178428 A1 | 8/2005 | Laaly et al. | |
| 2005/0178429 A1 | 8/2005 | McCaskill et al. | |
| 2005/0279400 A1 | 12/2005 | Banister et al. | |
| 2006/0201545 A1 | 9/2006 | Ovshinsky et al. | |
| 2007/0251571 A1 | 11/2007 | Jacobs et al. | |
| 2008/0178928 A1 | 7/2008 | Warfield et al. | |
| 2008/0216889 A1 | 9/2008 | Blong et al. | |
| 2008/0236653 A1 | 10/2008 | Kelly | |
| 2008/0245405 A1 | 10/2008 | Garvison et al. | |
| 2008/0302030 A1 * | 12/2008 | Stancel et al. | 52/173.3 |
| 2009/0000222 A1 | 1/2009 | Kalkanoglu et al. | |
| 2009/0159118 A1 * | 6/2009 | Kalkanoglu et al. | 136/251 |
| 2010/0132296 A1 * | 6/2010 | Bootier et al. | 52/546 |
| 2011/0017278 A1 * | 1/2011 | Kalkanoglu et al. | 136/251 |
| 2012/0110932 A1 * | 5/2012 | Ehbing et al. | 52/173.3 |
| 2013/0067852 A1 * | 3/2013 | Kalkanoglu et al. | 52/745.06 |

FOREIGN PATENT DOCUMENTS

| | | |
|---|---|---|
| GB | 2438526 A | 11/2007 |
| JP | 3-22572 | 1/1991 |
| JP | 11-159061 | 6/1999 |
| JP | 2002-188247 | 7/2002 |
| JP | 2004-293118 | 10/2004 |
| WO | 92/06144 A1 | 4/1992 |
| WO | 92/06847 A1 | 4/1992 |
| WO | 01/94719 A1 | 12/2001 |
| WO | 2005/091379 A2 | 9/2005 |
| WO | 2006/098974 A1 | 9/2006 |
| WO | 2006121433 A1 | 11/2006 |
| WO | 2007/088485 A2 | 8/2007 |
| WO | 2008073905 A2 | 6/2008 |
| WO | 2008/137966 A1 | 11/2008 |
| WO | 2009/095762 A1 | 8/2009 |

* cited by examiner

PHOTOVOLTAIC ROOFING ELEMENTS INCLUDING TIE LAYER SYSTEMS AND ROOFS USING THEM

CROSS-REFERENCE TO RELATED APPLICATIONS

This application is a continuation of U.S. patent application Ser. No. 12/266,409, which is hereby incorporated herein by reference its entirety, and which claims priority under 35 U.S.C. §119(e) to U.S. Provisional Patent Application Ser. No. 60/985,932, filed Nov. 6, 2007; Ser. No. 60/985,935, filed Nov. 6, 2007; and Ser. No. 60/986,556, filed Nov. 8, 2007 each of which is hereby incorporated herein by reference in its entirety.

BACKGROUND OF THE INVENTION

1. Field of the Invention

The present invention relates generally to photovoltaic devices. The present invention relates more particularly to photovoltaic roofing products in which a photovoltaic element is joined to a roofing substrate.

2. Summary of the Related Art

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as device performance has improved. They can be used to provide at least a significant fraction of the electrical energy needed for a building's overall function; or they can be used to power one or more particular devices, such as exterior lighting systems.

Photovoltaic cells are often provided as encapsulated photovoltaic elements, in which one or more cells are electrically interconnected and packaged together in between layers of layer material. The layer materials are often chosen to be highly light-transmissive, and to retain their transmissivity over time. Encapsulated photovoltaic elements can be convenient for integration with various substrates. However, in many circumstances, formation of a long-lived physical connection between the material of the encapsulated photovoltaic element and the material of a substrate can be difficult, especially when the materials used to make the encapsulated photovoltaic element have low surface tension. Moreover, adhesion between photovoltaic elements and substrates can be problematic even when the photovoltaic element is not encapsulated, especially around the periphery of the photovoltaic element.

SUMMARY OF THE INVENTION

One aspect of the present invention is a photovoltaic roofing element comprising:

an encapsulated photovoltaic element having a top surface and a bottom surface, a top layer material at its top surface and a bottom layer material at its bottom surface;

a roofing substrate having a top surface; and a tie layer system disposed between the encapsulated photovoltaic element and the roofing substrate and joining the bottom surface of the encapsulated photovoltaic element to the top surface of the roofing substrate.

Another aspect of the invention is a roof comprising one or more photovoltaic devices as described above attached to a roof deck.

Another aspect of the invention is a method of making a photovoltaic roofing element as described above, the method comprising:

affixing the tie layer system to the bottom surface of the encapsulated photovoltaic element; then joining the bottom surface of the encapsulated photovoltaic element to the top surface of the roofing substrate through the tie layer system.

Another aspect of the invention is a method of making a photovoltaic roofing element as described above, the method comprising:

affixing the tie layer system to the top surface of the roofing substrate; then joining the top surface of the roofing substrate to the bottom surface of the encapsulated photovoltaic element with the tie layer system.

Another aspect of the invention is a method of making a photovoltaic roofing element as described above, the method comprising:

affixing one component of the tie layer system to the top surface of the roofing element;

affixing another component of the tie layer system to the bottom surface of the encapsulated photovoltaic element; and joining the top surface of the roofing substrate to the bottom surface of the encapsulated photovoltaic element, thereby bringing together the components of the tie layer system.

Another aspect of the invention is a method of making a photovoltaic roofing element as described above, the method comprising:

arranging the tie layer system between the top surface of the roofing substrate and the bottom surface of the encapsulated photovoltaic element; then joining the top surface of the roofing substrate to the bottom surface of the encapsulated photovoltaic element with the tie layer system.

Another aspect of the invention is a photovoltaic roofing element comprising:

a roofing substrate having a top surface;

a photovoltaic element disposed on the top surface of the roofing substrate; and a tie layer system joining the roofing substrate to the photovoltaic element, wherein the distance between the roofing substrate and the photovoltaic element is substantially greater at the periphery of the photovoltaic element than it is at the center of the photovoltaic element.

Another aspect of the invention is a roof comprising a plurality of photovoltaic roofing elements as described above disposed on a roof deck.

The photovoltaic roofing elements, roofs and methods of the present invention can result in a number of advantages over prior art methods. For example, the photovoltaic roofing elements of the present invention can provide enhanced adhesion between the photovoltaic element and the roofing substrate.

The accompanying drawings are not necessarily to scale, and sizes of various elements can be distorted for clarity.

DETAILED DESCRIPTION OF THE INVENTION

Figure 1:
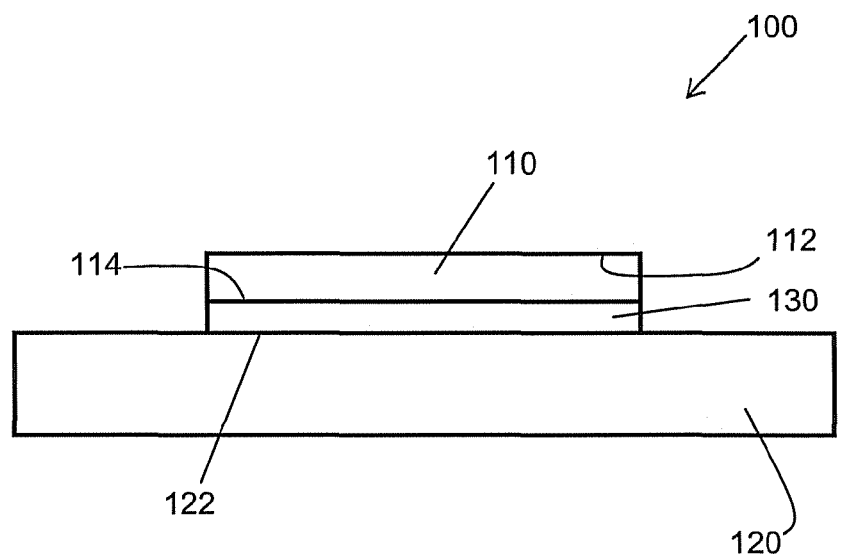
FIG. 1 is a schematic cross-sectional view of a photovoltaic roofing element according to one embodiment of the present invention.

One embodiment of a photovoltaic roofing element according to the present invention is shown in schematic cross-sectional view in FIG. 1. Photovoltaic roofing element 100 includes an encapsulated photovoltaic element 110 and a roofing substrate 120. Encapsulated photovoltaic element 110 has a top surface 112 and a bottom surface 114, a top layer material at its top surface 112, and a bottom layer material at its bottom surface 114. The roofing substrate 120 has a top surface 122. Photovoltaic roofing element 100 further comprises a tie layer system 130 disposed between the encapsulated photovoltaic element 110 and the roofing substrate 120, and joining the bottom surface 114 of the encapsulated photovoltaic element to the top surface 122 of the roofing substrate.

Encapsulated photovoltaic element 110 comprises one or more interconnected photovoltaic cells. The photovoltaic cells of encapsulated photovoltaic element 110 can be based on any desirable photovoltaic material system, such as monocrystalline silicon; polycrystalline silicon; amorphous silicon; III-V materials such as indium gallium nitride; II-VI materials such as cadmium telluride; and more complex chalcogenides (group VI) and pnicogenides (group V) such as copper indium diselenide or CIGS. For example, one type of suitable photovoltaic cell includes an n-type silicon layer (doped with an electron donor such as phosphorus) oriented toward incident solar radiation on top of a p-type silicon layer (doped with an electron acceptor, such as boron), sandwiched between a pair of electrically-conductive electrode layers. Thin-film amorphous silicon materials can also be used, which can be provided in flexible forms. Another type of suitable photovoltaic cell is an indium phosphide-based thermo-photovoltaic cell, which has high energy conversion efficiency in the near-infrared region of the solar spectrum. Thin film photovoltaic materials and flexible photovoltaic materials can be used in the construction of encapsulated photovoltaic elements for use in the present invention. In one embodiment of the invention, the encapsulated photovoltaic element includes a monocrystalline silicon photovoltaic cell or a polycrystalline silicon photovoltaic cell.

As described above, encapsulated photovoltaic element 110 includes a top layer material at its top surface, and a bottom layer material at its bottom surface. The top layer material can, for example, provide environmental protection to the underlying photovoltaic cells, and any other underlying layers. Examples of suitable materials for the top layer material include fluoropolymers, for example ETFE (e.g., NORTON® EFTE film available from Saint Gobain), PFE, FEP (e.g., NORTON® FEP film available from Saint Gobain), PCTFE or PVDF. The top layer material can alternatively be, for example, a glass sheet, or a non-fluorinated polymeric material. The bottom layer material can be, for example, a fluoropolymer, for example ETFE, PFE, FEP, PVDF or PVF ("TEDLAR"). The bottom layer material can alternatively be, for example, a polymeric material (e.g., polyester such as PET, or polyolefin such as polyethylene); or a metallic material (e.g., stainless steel or aluminum sheet). In certain embodiments of the invention, the bottom layer material has a surface tension no greater than about 35 dyne/cm.

Figure 2:
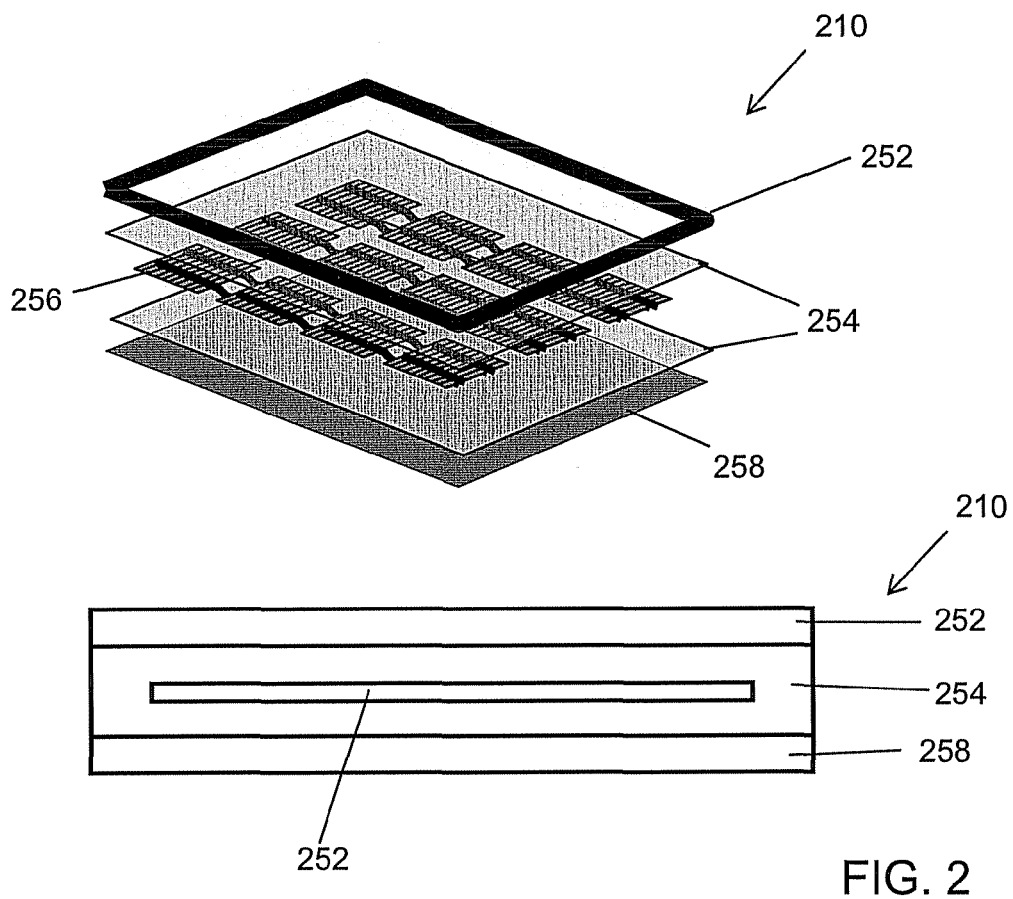
FIG. 2 is a schematic exploded view and a schematic side cross-sectional view of an encapsulated photovoltaic element suitable for use in the present invention.

As the person of skill in the art will appreciate, the encapsulated photovoltaic element can include other layers interspersed between the top layer material and the bottom layer material. For example, the encapsulated photovoltaic element can include structural elements (e.g., a reinforcing layer of glass fiber, microspheres, metal or polymer fibers, or a rigid film); adhesive layers (e.g., EVA to adhere other layers together); mounting structures (e.g., clips, holes, or tabs); and one or more optionally connectorized electrical cables for electrically interconnecting the photovoltaic cell(s) of the encapsulated photovoltaic element with an electrical system. An example of an encapsulated photovoltaic element suitable for use in the present invention is shown in schematic exploded view and schematic side cross-sectional view in FIG. 2. Encapsulated photovoltaic element 210 includes a top protective layer 252 (e.g., glass or a fluoropolymer film such as ETFE, PVDF, PVF, FEP, PFA or PCTFE); encapsulant layers 254 (e.g., EVA, functionalized EVA, crosslinked EVA, silicone, thermoplastic polyurethane, maleic acid-modified polyolefin, ionomer, or ethylene/(meth)acrylic acid copolymer); a layer of electrically-interconnected photovoltaic cells 256; and a backing layer 258 (e.g., PVDF, PVF, PET). In certain embodiments of the invention, the bottom layer material of the encapsulated photovoltaic element extends beyond the periphery of the layer of photovoltaic cells, such that the top and bottom layers of the encapsulated photovoltaic element, as shown in FIG. 2.

Figure 3:
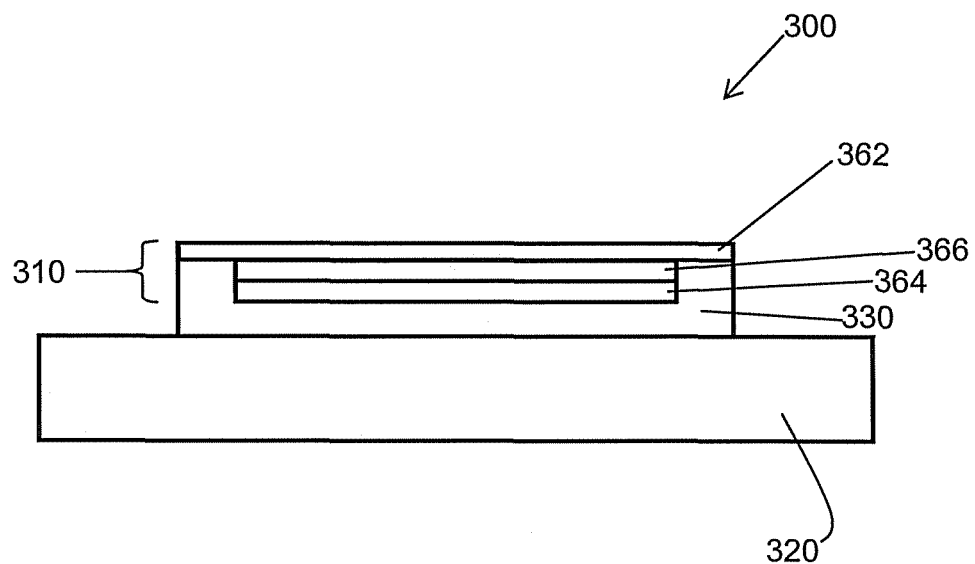
FIG. 3 is a schematic cross-sectional view of a photovoltaic roofing element according to another embodiment of the invention.

In one embodiment of the invention, the encapsulated photovoltaic element includes a top layer material that extends laterally beyond the other layers thereof, so that the bottom surface of the encapsulated photovoltaic element comprises the top layer material, or example, as shown in schematic cross-sectional view in FIG. 3. Photovoltaic roofing element 300 includes encapsulated photovoltaic element 310, roofing substrate 320, and tie layer system 330 joining the two. Photovoltaic element 310 includes a top layer material 362, a bottom layer material 364, and a layer 366 of photovoltaic cells. The top layer material extends laterally beyond the other layers thereof, so that the tie layer system joins the top layer material to the roofing substrate.

The encapsulated photovoltaic element can include at least one antireflection coating, for example as the top layer material, or disposed between the top layer material and the photovoltaic cells.

Suitable encapsulated photovoltaic elements and/or photovoltaic cells can be obtained, for example, from China Electric Equipment Group of Nanjing, China, as well as from several domestic suppliers such as Uni-Solar, Sharp, Shell Solar, BP Solar, USFC, FirstSolar, General Electric, Schott Solar, Evergreen Solar and Global Solar. Thin film-based photovoltaic cells can be especially suitable due to their durability, low heat generation, and off-axis energy collection capability. The person of skill in the art can fabricate encapsulated photovoltaic elements using techniques such as lamination or autoclave processes. The encapsulated photovoltaic elements can be made, for example, using methods disclosed in U.S. Pat. No. 5,273,608, which is hereby incorporated herein by reference.

The top surface of encapsulated photovoltaic element is the surface presenting the photoelectrically-active areas of its one or more photoelectric cells. When installed, the photovoltaic roofing elements of the present invention should be oriented so that the top surface of the encapsulated photovoltaic element is illuminated by solar radiation.

The encapsulated photovoltaic element also has an operating wavelength range. Solar radiation includes light of wavelengths spanning the near UV, the visible, and the near infrared spectra. As used herein, the term "solar radiation," when used without further elaboration means radiation in the wavelength range of 300 nm to 1500 nm, inclusive. Different photovoltaic elements have different power generation efficiencies with respect to different parts of the solar spectrum. Amorphous doped silicon is most efficient at visible wavelengths, and polycrystalline doped silicon and monocrystalline doped silicon are most efficient at near-infrared wavelengths. As used herein, the operating wavelength range of an encapsulated photovoltaic element is the wavelength range over which the relative spectral response is at least 10% of the maximal spectral response. According to certain embodiments of the invention, the operating wavelength range of the photovoltaic element falls within the range of about 300 nm to about 2000 nm. In certain embodiments of the invention, the operating wavelength range of the encapsulated photovoltaic element falls within the range of about 300 nm to about 1200 nm. For example, for encapsulated photovoltaic elements having photovoltaic cells based on typical amorphous silicon materials the operating wavelength range is between about 375 nm and about 775 nm; for typical polycrystalline silicon materials the operating wavelength range is between about 600 nm and about 1050 nm; and for typical monocrystalline silicon materials the operating wavelength range is between about 425 nm and about 1175 nm.

The present invention can be practiced using any of a number of types of roofing substrates. For example, in certain embodiments of the invention, the top surface of the roofing substrate is polymeric (e.g., a polymeric material, or a polymeric coating on a metallic material). In other embodiments of the invention, the top surface of the roofing substrate is metallic. In other embodiments of the invention, the top surface of the roofing substrate is coated with roofing granules (e.g., a bituminous material coated with roofing granules). In other embodiments of the invention, the top surface of the roofing substrate is bituminous (e.g., an uncoated bituminous roofing substrate). For example, the roofing substrate can be an asphalt roofing shingle (e.g., coated with roofing granules, or uncoated by roofing granules in the area upon which the encapsulated photovoltaic element and tie layer system are disposed). In other embodiments of the invention, the roofing substrate is polymeric. For example, the roofing substrate can be a polymeric roofing tile or a polymeric roofing panel. Suitable polymers include, for example, polyolefin, polyethylene, polypropylene, ABS, PVC, polycarbonates, nylons, EPDM, fluoropolymers, silicone, rubbers, thermoplastic elastomers, polyesters, PBT, poly(meth)acrylates, epoxies, and can be filled or unfilled or formed. For example, in one embodiment of the invention the roofing substrate has polypropylene at its top surface. In certain embodiments of the invention, the roofing substrate does not have a fluoropolymer at its top surface. In other embodiments of the invention, the roofing substrate is a metal panel. The roofing substrate can be made of other materials, such as composite, ceramic, or cementitious materials.

In certain embodiments of the invention, the tie layer system is a polymeric tie layer system (i.e., it comprises one or more polymer layers). For example, in one embodiment of the invention, the tie layer system consists of a single polymer layer. In other embodiments of the invention, the tie layer system consists of a plurality of polymer layers. For example, a tie layer system can include an adhesive layer and a reinforcing layer and/or a surface activation layer. Yet in another example, the tie layer system can comprise other layers of structural features, such as woven or nonwoven mat, a fibrous surface, a patterned surface, a nano-structured surface, or blends of various materials to improve the bonding.

Especially suitable tie layer systems provide sufficient bond strength to join the bottom surface of the encapsulated photovoltaic element to the top surface of the substrate, and should be able to withstand severe outdoor weathering. In one embodiment of the invention, the tie layer system provides greater than 10 lb/inch adhesive bond strength in a 90° peel test. In certain embodiments, the tie layer system maintains the bond strength in severe outdoor conditions for an extended period of time, e.g., 20 years of service life. The tie layer system can, for example, meet the humidity-freeze cycle test, thermal cycle test, and damp-heat test requirements listed in IEC 1646. Moreover, in certain embodiments the materials of the tie layer system can flexibly be incorporated through use of a variety of adhesive processes.

A polymeric tie layer system can act to adhere the encapsulated photovoltaic element to the roofing substrate, especially when they are formed of partially incompatible materials. In one embodiment of the invention, the tie layer system consists of a single polymer layer having a surface tension in the range of about 25% to about 75% of the way between the surface tension value of the top surface of the roofing element and the surface tension value of the bottom surface of the encapsulated photovoltaic element.

In one embodiment of the invention, the tie layer system includes a polymeric material having a Chang viscoelastic window exhibiting at least one set of coordinates ($\log(G")$, $\log(G')$) lying within the window bound by the coordinates (4.5, 3), (4.5, 6), (6, 6), (6, 3) (e.g., pressure sensitive adhesives). In certain embodiments of the invention, the polymeric material has a Chang viscoelastic window exhibiting at least one set of coordinates ($\log(G")$, $\log(G')$) lying within the window bound by the coordinates (4.5, 6), (6, 6), (6, 3.7). In other embodiments of the invention, the polymeric material has a Chang viscoelastic window exhibiting at least one set of coordinates ($\log(G")$, $\log(G')$) lying within the window bound by the coordinates (4.5, 6), (4.5, 8), (8, 8), (8, 3.7), (6, 3.7). In other embodiments of the invention, the polymeric material has a Chang viscoelastic window exhibiting at least one set of coordinates ($\log(G")$, $\log(G')$) lying within the window bound by the coordinates (4.5, 6), (4.5, 8), (8, 8), (8, 3.7), (6, 3.7), (6, 6). $G"$ is the viscous shear modulus in units of Pa, and $G'$ is the elastic shear modulus in units of Pa. $G$ and $G"$ can be measured as described in ASTM 882-97, for example at frequencies of 0.01 R/S and 100 R/S. Dissipative pressure sensitive adhesives generally have Chang viscoelastic window coordinates within the above-referenced windows. Such materials are described in more detail in U.S. Pat. No. 6,869,981, and at pages 171-184 of Handbook of Pressure Sensitive Adhesive Technology, 3rd Ed., D. Satas editor, 1999, each of which is hereby incorporated herein by reference in its entirety; the UV curable materials described therein can be converted to heat-curable materials by changing initiators. Other examples include VHB adhesive materials available from 3M.

In certain embodiments of the invention, the tie layer system has a coefficient of thermal expansion ("CTE") between the CTE of the top surface of the roofing element and the CTE of the bottom surface of the encapsulated photovoltaic element, measured at 100° F. In one embodiment of the invention, the tie layer system consists has a CTE in the range of about 25% to about 75% of the way between the CTE of the top surface of the roofing element and the CTE of the bottom surface of the encapsulated photovoltaic element, measured at 100° F. In certain embodiments of the invention, the top surface of the roofing element is polypropylene with a CTE of $\sim 4 \times 10^{-5}$ in/in/° F. In another embodiment of the invention, the top surface of the roofing element is bitumen-based with a CTE of $\sim 2.5 \times 10^{-4}$ in/in/° F.

In certain embodiments of the invention, the tie layer materials are not conductive. In such embodiments, the photovoltaic elements do not require additional grounding to prevent electric shock or to meet electrical code requirements.

For example, the tie layer system can include one or more materials selected from the group consisting of a polyolefin functionalized with carboxylate and/or anhydride (e.g., maleic anhydride); ethylene vinyl acetate (optionally modified with anhydride); acid-modified polyolefins (e.g., ethylene/(meth)acrylic acid); a combination of an acid-modified polyolefin with an amine-functional polymer; maleic anhydride-grafted EPDM; a hot melt containing a thermoplastic or elastomeric fluoropolymer; and a curable resin (e.g., an epoxy resin such as BondiT from Reltek LLC, or an ethylenically-unsaturated resin), butyl adhesives, or pressure-sensitive adhesives. Examples of such materials are described, for example, in U.S. Pat. Nos. 6,465,103; 6,632,518; 7,070,675; 6,524,671; 5,143,761; and 6,630,047, each of which is hereby incorporated herein by reference in its entirety.

In certain embodiments of the invention, the tie layer system is a blend of functionalized EVA and polyolefin (e.g., polypropylene). For example, the tie layer system can contain 5-75% by weight of polyolefin (e.g., 15-55%). The tie layer system can be, for example, a 70% polypropylene/30% EVA blend, or a 50% polypropylene/50% EVA blend. In other embodiments of the invention, the tie layer system includes (or consists essentially of) an EVA-based PSA (e.g., HB Fuller HL2688PT); EVA (e.g., DuPont Bynel 3860); maleic acid-grafted EVA (e.g., DuPont Bynel E418); maleic acid grafted polypropylene (e.g., Equistar Plexar 6002); an epoxy/maleic acid grafted ethylene/butyl acrylate polymer (e.g., Arkema Lotader AX8900); a blend of polypropylene, PVDF and functionalized EVA-based pressure-sensitive adhesive (e.g., 50% polypropylene, 25% Arkema 2500, 25% HP Fuller 9917); a polyethylene/polypropylene copolymer (e.g., Dow Versify DE2300 having 12% ethylene content); or a functionalized EVA-based pressure-sensitive adhesive (e.g., HP Fuller 9917). In such embodiments, the top surface of the roofing substrate can be, for example, polyolefin (e.g., polypropylene).

In other embodiments of the invention, the tie layer system comprises an amino-substituted organosilane layer, for example as described in U.S. Pat. No. 6,753,087, which is hereby incorporated herein by reference. For example, the tie layer system can comprise a polymeric layer (e.g., having polar functionality) having blended therein an amino-substituted organosilane.

Figure 4:
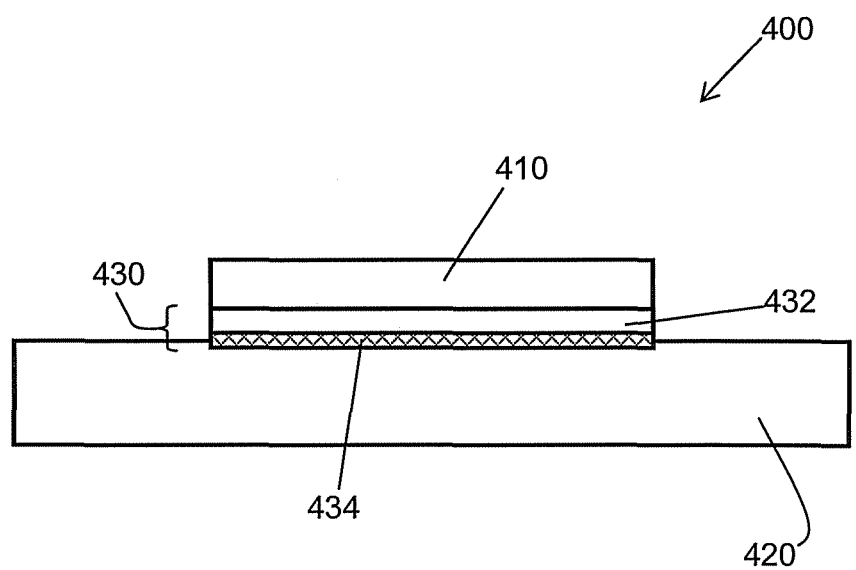
FIG. 4 is a schematic cross-sectional view of a photovoltaic roofing element including a textured layer according to one embodiment of the invention.

In one embodiment of the invention, the tie layer system comprises a textured layer. The textured layer can be, for example, a fabric, scrim, non-woven web, a porous film, or a sheet having a microstructured surface. The textured layer can provide additional surface area for adhesion of the encapsulated photovoltaic element to the roofing substrate. In certain embodiments of the invention, the textured layer can intermingle with the materials of the encapsulated photovoltaic element, the roofing substrate, and/or any other layers of the tie layer system in order to improve adhesion through mechanical interlocking. A textured layer can be especially useful in conjunction with a bituminous roofing substrate; during fabrication, the textured layer can embed itself in the softened bituminous material. Similarly, a textured layer can be useful in conjunction with a polymeric roofing substrate, embedding itself in the polymeric material through use of heat and/or pressure. In certain embodiments of the invention, the textured layer is a fibrous layer (e.g., scrim, fabric, nonwoven web). Textured layers are described in more detail in U.S. Patent Application Publication no. 2008/0248241, which is hereby incorporated herein by reference in its entirety. In certain embodiments of the invention, the material of the textured layer is at least partially embedded in the material of the top surface of the roofing substrate. The textured layer can be, for example, nonwoven or woven glass mat, chopped glass fibers, polymer fibers, roofing granules, sand or quartz grits, a porous polymer layer, a fabric (e.g., woven or nonwoven PP or PET), or a felt. In other embodiments of the invention, the textured layer is achieved by mechanically embossing or chemically etching the top surface of the roofing substrate, or the bottom surface of the encapsulated PV element, or the combination of both to provide mechanical interlocking For example, a tie layer system can comprise one or more polymeric layers on top of a textured layer, as shown in FIG. 4. Photovoltaic roofing element 400 comprises an encapsulated photovoltaic element 410 and a roofing substrate 420 joined by a tie layer system 430. Tie layer system 430 comprises a polymer layer 432 and a textured layer 434. The polymeric layer 432 can be selected to adhere to the bottom surface of the encapsulated polymeric layer, and the textured layer can be selected to physically intermingle with and/or adhere to the upper surface of the roofing substrate. In this embodiment of the invention, the textured layer can be, for example, fibrous material adhered to the bottom surface of the polymer layer. The roofing substrate can be, for example, a bituminous roofing substrate (e.g., an asphalt shingle), or a polymeric roofing substrate (e.g., a thermoplastic tile).

In other embodiments of the invention, the tie layer system consists essentially of a textured layer. In such embodiments, the textured layer can physically intermingle and/or adhere to the upper surface of the roofing substrate.

The thickness of the tie layer system can be, for example, in the range of about 25 μm to about 2.5 mm. In certain embodiments of the invention, the thickness of the tie layer system is in the range of about 50 μm to about 1 mm.

Examples of various processes for completing the bonding of the tie layer between the bottom layer of the encapsulated photovoltaic element and top surface of the roofing substrate may include, for example, compression molding, injection molding, co-extrusion, lamination, vacuum lamination (e.g., to remove air bubbles and outgassing), ultrasonic welding, vibration welding, laser welding, and IR welding.

In some embodiments of this invention, the top surface of the roofing substrate or the bottom surface of the roofing substrate or both can be surface treated to enhance their affinity to the tie layer. Examples of the surface treatments include flame treatment, plasma treatment, corona treatment, ozone treatment, sodium treatment, etching, ion implantation, electron bean treatment, or combinations thereof.

The tie layer system can be arranged in any of a number of configurations in the photovoltaic roofing elements of the present invention. For example, in one embodiment of the invention, the tie layer system underlies substantially the entire area of the encapsulated photovoltaic element. In other embodiments of the invention, the tie layer system underlies only parts of the area of the encapsulated photovoltaic element. For example, the tie layer system can be configured in a plurality of contiguous or discontiguous zones beneath the encapsulated photovoltaic element. The tie layer system can be configured, for example, as stripes, lattices, spots, or patches. In one embodiment of the invention, the tie layer system is arranged only around the perimeter (e.g., around the entire perimeter) of the bottom surface of the encapsulated photovoltaic element. The tie layer system can extend laterally beyond the periphery of the encapsulated photovoltaic element. In certain embodiments of the invention, however, the tie layer system does not extend laterally beyond the periphery of the encapsulated photovoltaic element by more than about 1 cm.

Another aspect of the invention is a photovoltaic roofing element comprising a roofing substrate having a top surface, a photovoltaic element disposed on the top surface of the roofing substrate, the photovoltaic element having a center and a periphery, and a tie layer system joining the roofing substrate to the photovoltaic element. The distance between the roofing substrate and the photovoltaic element is substantially greater at the periphery of the photovoltaic element than it is at the center of the photovoltaic element. The roofing substrate and tie layer according to this aspect of the invention can be, for example, substantially as described above. The photovoltaic element according to this aspect of the invention can be any suitable photovoltaically-active device. It can be, for example, an encapsulated photovoltaic element as described above. It can alternatively be substantially as described above, but not encapsulated. Use of a varying distance between the roofing substrate and the photovoltaic element can help reduce thermomechanical stresses in the joining of the roofing substrate and the photovoltaic element, especially along the edges and corners of the photovoltaic element, where failure or debonding often initiates.

Figure 5:
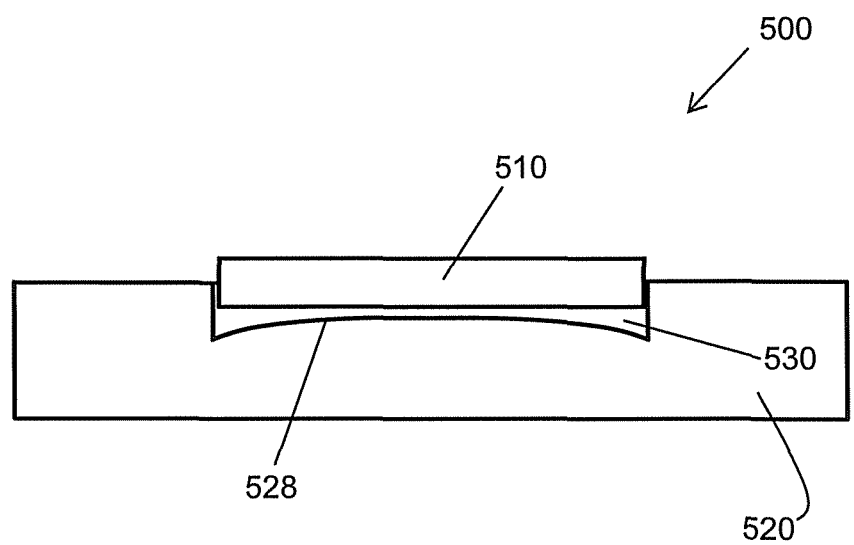
FIGS. 5 and 6 are schematic cross-sectional views of photovoltaic roofing elements including a roofing element having a convexly shaped top surface according to certain embodiments of the invention.
Figure 6:
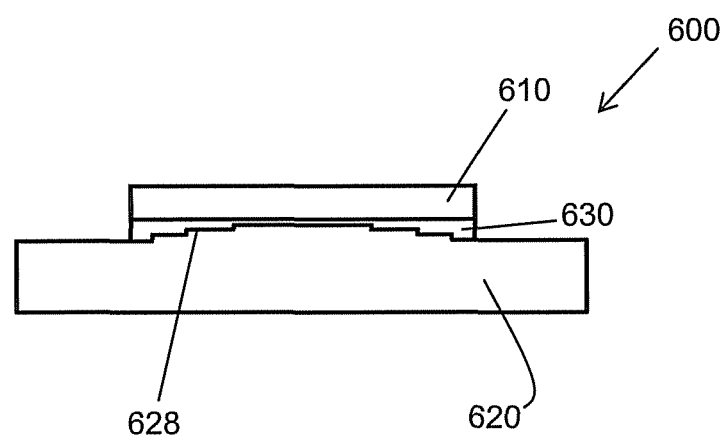

In one embodiment of the invention, shown in FIG. 5, the roofing substrate has a convexly shaped top surface, and the photovoltaic element is disposed on the convexly shaped top surface. Such an arrangement can improve the stress distribution within the tie layer system and reduce edge delamination and/or edge curling in bonded systems. Photovoltaic roofing element 500 includes a photovoltaic element 510, a roofing substrate 520 having a convexly shaped top surface 528, and a tie layer system 530 joining the photovoltaic element 510 to the roofing substrate 520. Similarly, in FIG. 6, photovoltaic roofing element 600 includes a photovoltaic element 610 and a roofing substrate 620 having a convexly shaped top surface 628, and a tie layer system 630 joining the photovoltaic element 610 to the roofing substrate 620. The convexly shaped top surface can have, for example, a smoothly varying profile, decreasing in height as shown in FIG. 5, or alternatively can have a stepped profile as shown in FIG. 6. The convexly shaped top surface can be disposed in an indentation formed in the top surface of the roofing substrate, as shown in FIG. 5, or can protrude from the top surface of the roofing substrate, as shown in FIG. 6. The convexly shaped top surface can have any of a number of geometries. For example, it can have a parabolic profile, a circular profile, or a compound curvature. When the convexly shaped top surface has a stepped profile, the individual steps can for example be horizontal, curved (e.g., like a Fresnel lens), or slanted. The photovoltaic element 510 is disposed on convexly shaped top surface 528, with the tie layer system 530 joining the two. The distance between the convexly shaped top surface of the roofing substrate and the photovoltaic element is substantially greater at the periphery of the photovoltaic element than it is at the center of the photovoltaic element.

In certain embodiments of the invention, the distance between the roofing substrate and the photovoltaic element is at least about twice as long at the periphery of the photovoltaic element than it is at the center of the photovoltaic element.

In certain embodiments of the invention, the convexly shaped surface is graded in height at least along the area within 1 cm of the periphery of the photovoltaic element. For example, the convexly shaped surface can have a plateau shape, flat in the neighborhood of the center of the photovoltaic element, and graded in height at least along the area within 1 cm of the periphery of the photovoltaic element.

The photovoltaic roofing elements of the present invention can have other features. For example, additional surfacing media such as silica granules or polymer granules with high transmittance to solar radiation can be disposed on the top surface of the photovoltaic element to provide a textured surface or added aesthetic value, such as described in U.S. patent application Ser. No. 11/742,909, which is hereby incorporated herein by reference in its entirety. The photovoltaic roofing elements can also include a colored and/or patterned layer, for example to tune the appearance and/or to provide a masking effect to the photovoltaic element. The colors and/or patterns can be created using, for example, optical interference, stacks of dielectric layers, special bandwidth-transmissive pigments, nanometallic particles (e.g., Cermet Film available from Saint-Gobain Corp.), or quantum dot technology. Colored and/or patterned layers are described, for example, in U.S. patent application Ser. No. 12/145,166, which is hereby incorporated herein by reference in its entirety. The photovoltaic roofing element can also include a layer disposed on the roofing substrate that will reflect unwanted near-IR radiation of the solar spectrum, thereby allowing the photovoltaic element to operate at a lower temperature (and therefore more efficiently). IR-reflective materials are described, for example, in U.S. patent application Ser. No. 12/266,481, entitled "PHOTOVOLTAIC ROOFING ELEMENTS AND ROOFS USING THEM" and filed on even date herewith, as well as in U.S. Patent Application Ser. Nos. 60/985,940, 60/985,943, and 60/986,221, each of which is hereby incorporated herein by reference in its entirety.

One or more of the photovoltaic roofing elements described above can be installed on a roof as part of a photovoltaic system for the generation of electric power. Accordingly, one embodiment of the invention is a roof comprising one or more photovoltaic roofing elements as described above disposed on a roof deck. The photovoltaic elements of the photovoltaic roofing elements are desirably connected to an electrical system, either in series, in parallel, or in series-parallel, as would be recognized by the skilled artisan. There can be one or more layers of material, such as underlayment, between the roof deck and the photovoltaic roofing elements of the present invention. The photovoltaic roofing elements of the present invention can be installed on top of an existing roof; in such embodiments, there would be one or more layers of standard (i.e., non-photovoltaic) roofing elements (e.g., asphalt coated shingles) between the roof deck and the photovoltaic roofing elements of the present invention. Electrical connections are desirably made using cables, connectors and methods that meet UNDERWRITERS LABORATORIES and NATIONAL ELECTRICAL CODE standards. Even when the photovoltaic roofing elements of the present invention are not installed on top of preexisting roofing materials, the roof can also include one or more standard roofing elements, for example to provide weather protection at the edges of the roof, or in any hips, valleys, and ridges of the roof.

Figure 7:
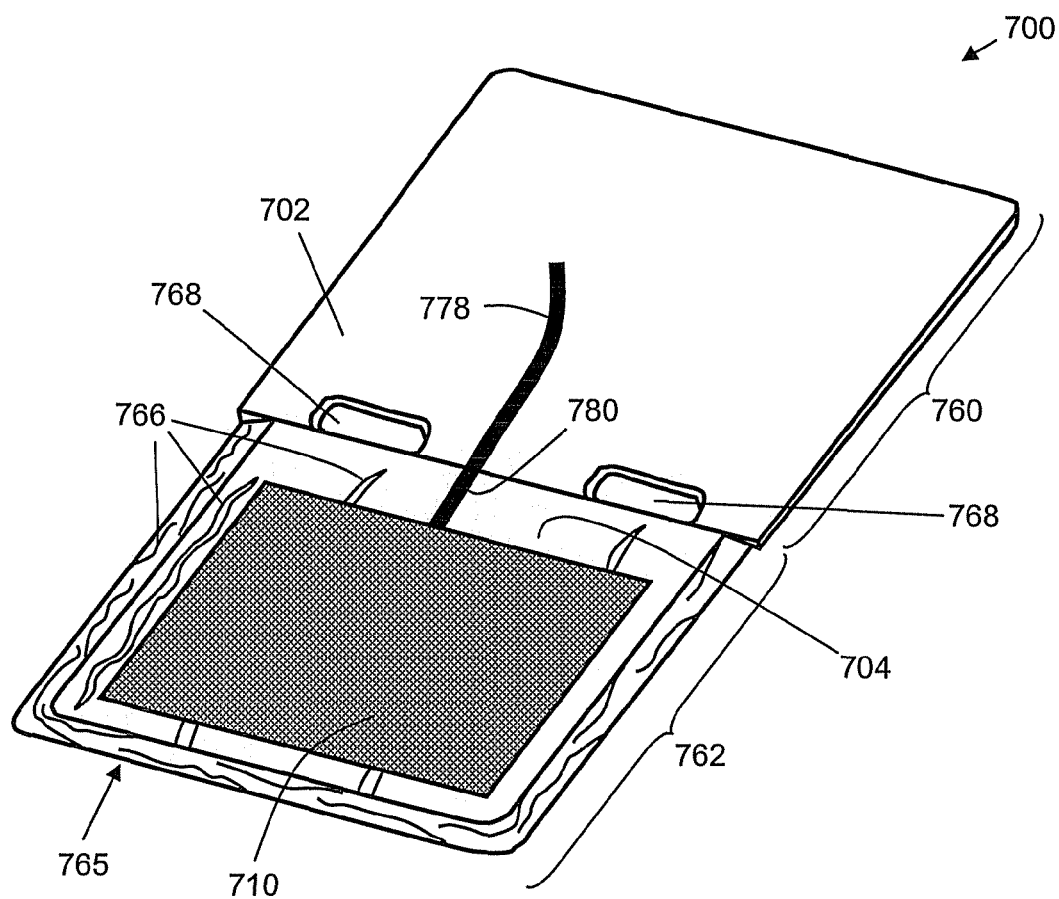
FIG. 7 is a top perspective view of photovoltaic roofing element and a roof according to certain embodiments of the invention.
Figure 7:
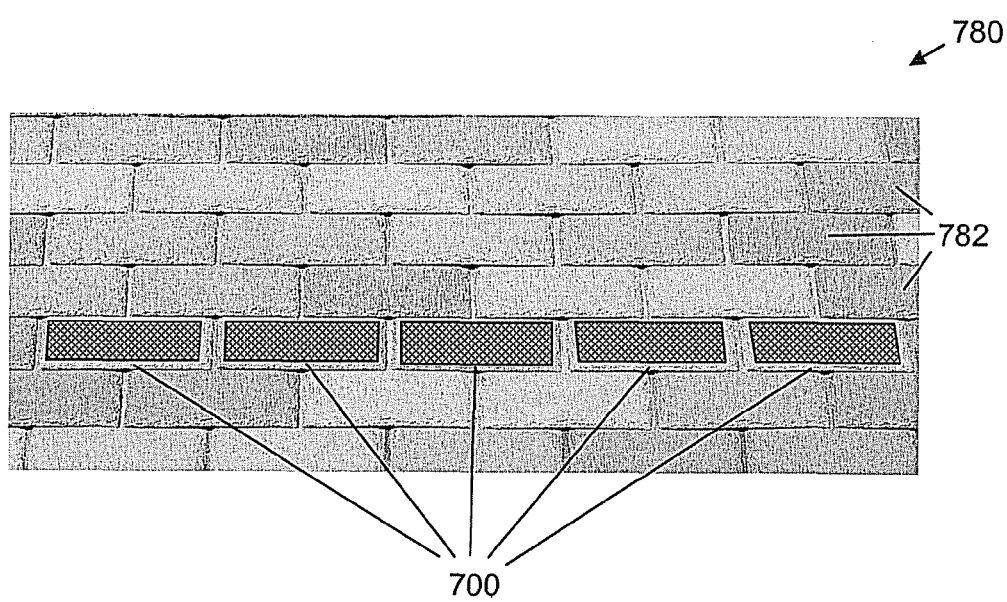

FIG. 7 shows a roof according to this aspect of the invention, in which a plurality of photovoltaic roofing elements 700 is disposed on a roof deck along with a plurality of standard roofing elements. Photovoltaic roofing element 700 is a photovoltaic roofing tile having a headlap portion 760 and a butt portion 762. The photovoltaic element 710 is affixed to polymeric carrier tile 702 in its butt portion 762. In certain embodiments of the invention, and as shown in FIG. 7, the butt portion 762 of the polymeric carrier tile 702 has features 766 molded into its surface, in order to provide a desired appearance to the polymeric carrier tile. In the embodiment shown in FIG. 7, the polymeric carrier tile 702 has a pair of recessed nailing areas 768 formed in its headlap portion 760, for example as described in International Patent Application Publication no. WO 08/052,029, which is hereby incorporated herein by reference in its entirety. In certain embodiments of the invention, and as shown in FIG. 7, the photovoltaic element 710 has coupled to it at least one electrical lead 778. The electrical lead can be disposed in a channel 780 formed in the top surface 704 of the polymeric carrier tile 702. The U-shaped periphery along the right and left sides and lower edge of the butt portion 762 slopes downwardly from its top surface to its bottom surface, as shown at 765. Examples of these photovoltaic roofing elements are described in more detail in U.S. patent application Ser. No. 12/146,986, which is hereby incorporated herein by reference in its entirety. FIG. 7 also shows a roof 780 comprising five photovoltaic roofing elements 700 and a plurality of polymeric roofing tiles 782. The electrical leads 778 (not shown) are interconnected into an electrical system to collect the electrical energy generated by the photovoltaic elements 710.

Photovoltaic roofing elements of the present invention can be fabricated using many techniques familiar to the skilled artisan. Roofing substrates can be made using a variety of techniques. For example, when the roofing substrate is an asphalt shingle or an asphalt non-woven glass reinforced laminate, the person of skill in the art can use methods described in U.S. Pat. Nos. 5,953,877; 6,237,288; 6,355,132; 6,467,235; 6,523,316; 6,679,308; 6,715,252; 7,118,794; U.S. Patent Application Publication 2006/0029775; and International Patent Application Publication WO 2006/121433, each of which is hereby incorporated herein by reference in its entirety. Photovoltaic roofing elements can be fabricated in a continuous process and then cut into individual elements as is done in the fabrication of asphalt shingles. When a continuous process is used, it can be necessary to individually prepare any electrical cables running between elements, for example by cutting the cables between elements and adding connectors to the cut ends. When the roofing substrate is a polymeric tile, shake or panel, the person of skill in the art can use methods such as those described in U.S. patent application Ser. No. 12/146,986, which is hereby incorporated herein by reference.

Another aspect of the invention is a method of making a photovoltaic element as described above. In one embodiment of the invention, a method of making a photovoltaic roofing element comprises affixing a tie layer system as described above to the bottom surface of a photovoltaic element as described above (e.g., an encapsulated photovoltaic element); then joining the bottom surface of the photovoltaic element to the top surface of a roofing substrate through the tie layer system. In another embodiment of the invention, a method of making a photovoltaic roofing element comprises affixing a tie layer system as described above to the top surface of a roofing substrate as described above; then joining the top surface of the roofing substrate to the bottom surface of a photovoltaic element with the tie layer system.

In another embodiment of the invention, a method of making a photovoltaic element comprises affixing one component of the tie layer system to the top surface of the roofing element; affixing another component of the tie layer system to the bottom surface of the encapsulated photovoltaic element; and joining the top surface of the roofing substrate to the bottom surface of the encapsulated photovoltaic element, thereby bringing together the components of the tie layer system. The different components of the tie layer system can be, for example, different layers of the tie layer system, or layers of the same material that come together to form a single layer tie layer system.

In another embodiment of the invention, a method of making a photovoltaic roofing element comprises arranging the tie layer system between the top surface of the roofing substrate and the bottom surface of the encapsulated photovoltaic element; then joining the top surface of the roofing substrate to the bottom surface of the encapsulated photovoltaic element with the tie layer system. The methods above can also include, before affixing to, arranging, or joining to the photovoltaic element treating or activating the bottom surface of the photovoltaic element, for example by cleaning with solvent, plasma treatment, flame treatment, corona treatment, amine-functionalized priming, heating, microwaving, gyrotron radiation, or reducing agent treatment. The joining step can involve, for example, curing, heat treatment; and/or application of pressure, depending on the identity of the tie layer system. Methods such as compression molding, injection molding, co-extrusion, lamination, ultrasonic welding, vibratory welding, induction welding, laser welding and IR welding can be used to perform the joining step. In certain embodiments of the invention, when the roofing substrate has a thermoplastic material at its top surface, it is brought to a softened or molten state before it is joined with a textured surface of a tie layer, for example by infrared heating, microwave heating, CalRod, or other localized treatment.

The invention can be further described by the following non-limiting examples.

EXAMPLES

Example 1

Tie layer substrate materials that can bond to both to an encapsulated photovoltaic element and a polyolefin roofing substrate were studied by extruding tie layers directly on to the substrate in a extrusion/lamination machine. The substrate used in this example was polypropylene (Basell PP KS02, available from Basell Corp., Elkton, Md.) containing 30 wt % of calcium carbonate as filler. The substrate was extruded as a sheet using a Johnson 2" diameter extruder in combination with a 26" die using processing temperatures of the barrel at 370° F., die temperature at 350° F., roll temperature at 113° F., and screw speed at 35 rpm to a layer thickness of about 20 mil.

In a first stage experiment, the adhesion between various tie layer systems and the propylene substrate was studied by the using the same extruder to extrude tie layer system materials at a layer thickness in the range of about 6-10 mil. The adhesion was then evaluated by a T-peel test (ASTM D-1876) using an Instron tensile tester (Instron 1350-55R with Blue Hill software). The T-peel test was carried out at ambient laboratory conditions using 2" wide samples at a jaw separation speed of 10 inches per minute with a starting gage length of 1 inch. The results and the detailed extrusion information are listed in Table 1.

TABLE 1

| Tie Layer System Material | Description | Thickness (mil) | Process Temperature (° F.) | | | | | Peel Strength (lb/in) |
|---|---|---|---|---|---|---|---|---|
| | | | Barrel 1 | Barrel 2 | Barrel 3 | Adpt. | Dies | |
| HB Fuller HL2688PT | EVA based PSA | 5 | 300 | 300 | 300 | 290 | 285 | 15.4 |
| DuPont Bynel E418 | Maleic acid grated EVA | 10 | 330 | 350 | 325 | 310 | 300 | 3.1 |
| Sartomer PolyBD2035 | butadiene polyurethane | 5 | 400 | 450 | 400 | 400 | 350 | no bond |
| Equistar Plexar 6002 | maleic acid grafted polypropylene | 10 | 450 | 425 | 400 | 385 | 380 | 1.75 |
| DuPont Nucrel 1214 | ethylene methacrylic acid copolymer | 10 | 300 | 300 | 300 | 295 | 285 | no bond |
| L&L Products L-TE05-10 | thermoplastic epoxy | 7 | 340 | 325 | 315 | 315 | 315 | no bond |
| 70% PP/30% EVA blend | 70% PP(Basell KS021P)/30% Bynel E418 | 10 | 470 | 460 | 450 | 450 | 430 | 28.9 |
| Arkema Lotader AX8900 | epoxy & maleic acid grafted ethylene butyl acrylate | 7 | 470 | 460 | 450 | 450 | 430 | 3.9 |
| 50% PP/50% EVA blend | 50% PP (Basell KS021P)/50% Bynel 3860 | 10 | 330 | 330 | 325 | 325 | 320 | 15.7 |
| PP/PVDF/HP Fuller 9917 | 50% PP/25% Arkema 2500/25% HP Fuller 9917 | 7 | 500 | 525 | 510 | 510 | 500 | 5.4 |
| Dow Versify DE2300 | PE/PP copolymer, 12% ethylene content | 10 | 400 | 450 | 430 | 420 | 400 | 16.3 |

In a second stage experiment, various tie layer systems were extruded and laminated between the polypropylene substrate and a corona-treated ETFE film (10 mil TEFZEL film from DuPont). The adhesion was tested in the same T-peel test geometry. The details of the extrusion and the results of the adhesion test are shown in Table 2. The blend of polypropylene and functionalized EVA exhibited particularly good adhesion, and can therefore be especially useful in conjunction with polypropylene substrates. The functionalized EVA-based pressure sensitive adhesive was found to have sufficient peel strength and may be useful in special cases where a peel-and-stick type of application is needed.

Example 2

An encapsulated photovoltaic element affixed to a tie layer system was constructed by first laminating a top protective layer of ETFE film (TEFZEL from DuPont), an encapsulant layer of EVA (Elvax 3185 from DuPont Corp.), a photovoltaic cell (T-cell available from Uni-Solar Corp., Auburn Hill, Mich.), a back encapsulant layer of the same EVA, and a tie layer system consisting of a single layer of 30 wt % EVA (DuPont Bynel E418) and 70% polypropylene (Basell KS021P) using the same extruder as in Example 1. Once the multi-layer structure was fabricated, the assembly was then joined to a polypropylene substrate (#2898K13-¼" thick sheet stock available from McMaster-Carr Corp, New Brunswick, N.J.) using an ultrasonic welding technique. The ultrasonic welding was performed using a Branson 2000X system with 2.5 KW max power output on a sample piece of 5"×5".

TABLE 2

| Tie Layer System Material | Description | Thickness (mil) | Temp. for Lamination (° F.) | | | | | Peel Strength (lb/in) |
|---|---|---|---|---|---|---|---|---|
| | | | Barrel 1 | Barrel 2 | Barrel 3 | Adpt. | Dies | |
| HP Fuller 9917 | EVA based PSA, functionalized | 6 | 300 | 300 | 300 | 300 | 290 | 11.7 |
| DuPont Bynel 3860 | EVA | 10 | 380 | 475 | 450 | 440 | 420 | 2.6 |
| 1st layer: DuPont Bynel 3860 2nd layer: 70% PP/30% EVA | PP: Basell KS021P; EVA: DuPont Bynel E418 | ~16 | 380 | 475 | 450 | 440 | 420 | 29.3 |
| 32% PP/68% EVA | 32% Basell KS021P/68% DuPont Bynel 3860 | 10 | 450 | 470 | 450 | 440 | 420 | 5.2 |
| 15% PP/85% EVA | 15% Basell KS021P/85% DuPont Bynel 3859 | 8 | 450 | 470 | 450 | 440 | 420 | 2.9 |

Good adhesion was found to be achieved around the perimeter of the sample piece by using 50% power setting and 20,000 Hertz frequency for a duration of 0.5 second.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A photovoltaic roofing element comprising:
    an encapsulated photovoltaic element having a top surface and a bottom surface, a top layer material at its top surface and a bottom layer material at its bottom surface;
    a roofing substrate having a top surface; and
    a tie layer system disposed between the encapsulated photovoltaic element and the roofing substrate and joining the bottom surface of the encapsulated photovoltaic element to the top surface of the roofing substrate
    wherein the tie layer system includes a polymeric material having a Chang viscoelastic window exhibiting at least one set of coordinates ($\log(G")$, $\log(G')$) lying within the window bound by the coordinates (4.5, 3), (4.5, 6), (6, 6), (6, 3), or within the window bound by the coordinates (4.5, 6), (4.5, 8), (8, 8), (8, 3.7), (6, 3.7).

2. The photovoltaic roofing element of claim 1, wherein the bottom layer material of the encapsulated photovoltaic element comprises a fluoropolymer.

3. The photovoltaic roofing element of claim 1, wherein the roofing substrate is formed from polyolefin, polyethylene, polypropylene, ABS, PVC, polycarbonate, nylon, EPDM, fluoropolymer, silicone, rubber, thermoplastic elastomer, polyester, PBT, poly(meth)acrylate or epoxy.

4. The photovoltaic roofing element of claim 1, wherein the roofing substrate is formed from polycarbonate.

5. The photovoltaic roofing element of claim 1, wherein the tie layer system comprises one or more polymer layers.

6. The photovoltaic roofing element of claim 1, wherein the tie layer system includes a polymeric material having a Chang viscoelastic window exhibiting at least one set of coordinates ($\log(G")$, $\log(G')$) lying within the window bound by the coordinates (4.5, 3), (4.5, 6), (6, 6), (6, 3).

7. The photovoltaic roofing element of claim 1, wherein the tie layer system includes a polymeric material having a Chang viscoelastic window exhibiting at least one set of coordinates ($\log(G")$, $\log(G')$) lying within the window bound by the coordinates (4.5, 6), (4.5, 8), (8, 8), (8, 3.7), (6, 3.7).

8. The photovoltaic roofing element of claim 1, wherein the tie layer system comprises one or more materials selected from the group consisting of a polyolefin functionalized with carboxylate and/or anhydride; ethylene vinyl acetate; acid-modified polyolefins; a combination of an acid-modified polyolefin with an amine-functional polymer; maleic anhydride-grafted EPDM; a hot melt containing a thermoplastic or elastomeric fluoropolymer; and a curable resin.

9. The photovoltaic roofing element of claim 1, wherein the thickness of the tie layer system is in the range of 1 mil to 20 mil.

10. The photovoltaic roofing element of claim 1, wherein the tie layer system underlies substantially the entire area of the encapsulated photovoltaic element.

11. A roof comprising a plurality of photovoltaic roofing elements of claim 1 disposed on a roof deck.

* * * * *